United States Patent [19]

Tanaka

[11] Patent Number: 5,305,036
[45] Date of Patent: Apr. 19, 1994

[54] FOCUSING TORQUE CONTROL DEVICE FOR LENS BARREL

[75] Inventor: Hitoshi Tanaka, Tokyo, Japan

[73] Assignee: Asahi Kogaku Kogyo Kabushiki Kaisha, Tokyo, Japan

[21] Appl. No.: 885,882

[22] Filed: May 20, 1992

[30] Foreign Application Priority Data

May 21, 1991 [JP] Japan ............................. 3-068921[U]

[51] Int. Cl.⁵ .............................................. G03B 1/18
[52] U.S. Cl. .................... 354/195.1; 354/286; 354/289.1; 359/700; 359/823
[58] Field of Search .............. 354/195.1, 286, 289.1; 359/819, 823, 825, 826, 830, 700

[56] References Cited

U.S. PATENT DOCUMENTS

| | | | |
|---|---|---|---|
| 1,649,646 | 11/1927 | Badgley | 359/823 |
| 2,491,093 | 12/1949 | Dibble et al. | 359/823 |
| 2,737,082 | 3/1956 | Dowling | 359/700 |
| 3,964,082 | 6/1976 | Mita | 354/289.1 |
| 4,165,164 | 8/1979 | Akasaka | 354/289.1 |
| 4,173,404 | 11/1979 | Akasaka | 354/289.1 |
| 4,281,907 | 8/1981 | Kamata | 359/700 |
| 4,299,453 | 11/1981 | Momiyama | 359/700 |
| 4,309,077 | 1/1982 | Tomori | |
| 5,052,781 | 10/1991 | Iizuka | 359/823 |

FOREIGN PATENT DOCUMENTS 62-273504 11/1987 Japan .

OTHER PUBLICATIONS

English Language Abstract of Japanese Publication No. 62-273504.
Partial Translation of pp. 13 & 14 Marked by Brackets of Japanese Publication No. 62-273504.

*Primary Examiner*—Monroe H. Hayes
*Attorney, Agent, or Firm*—Sandler, Greenblum & Bernstein

[57] ABSTRACT

A focusing torque control device for a lens barrel includes a rotating unit, rotatable in association with a lens included in the lens barrel, an engaging pin by which the rotating unit is engaged, and a frictional force unit. The lens is moved along an optical axis thereof when the rotating unit is rotated. The frictional force control unit controls a frictional force between the rotating unit and the engaging pin by controlling a pressure force pressing the engaging pin against the rotating unit.

21 Claims, 3 Drawing Sheets

FOCUSING TORQUE CONTROL DEVICE FOR LENS BARREL

BACKGROUND OF THE INVENTION

1. Field of the Invention

The present invention relates to a focusing torque control device for a lens barrel of a camera.

2. Description of the Related Art

Conventionally, a camera having an automatic focusing lens, which can be switched between an automatic focusing operation (hereinafter referred to as AF mode) and a manual focusing operation (hereinafter referred to as MF mode), is known. This automatic focusing lens is provided with a drive shaft which, in the AF mode, is connected to a motor housed in the camera body, moving a lens along the optical axis. In the MF mode, the drive shaft is disconnected from the motor so that the lens can be manually moved.

In such an automatic focusing lens, a focusing operation in the AF mode should be carried out at a high-speed, and the electric power consumption of the motor should be low. Therefore, a drive force for displacing the lens in the optical axis must be made minimal to ensure smooth movement of the lens.

However, if the drive force for displacing the lens along the optical axis is lowered, the lens can be moved along the optical axis by even a small force in the MF mode. Thus, the operability of a manual focusing operation is not good.

SUMMARY OF THE INVENTION

Therefore, an object of the present invention is to provide a focusing torque control device in which the focusing torque, for moving the lens along the optical axis, is controlled to an appropriate amount.

According to the present invention, there is provided a focusing torque control device for a lens barrel. The device includes a rotating mechanism, an engaging member and a frictional force control mechanism. The rotating mechanism is rotatably disposed in the lens barrel to move a lens, housed in the lens barrel, along an optical axis thereof; the engaging member is engageable with the rotating mechamism. The frictional force control mechanism controls a frictional force between the rotating mechanism and the engaging member by controlling a pressure by which the engaging member is pressed against the rotating mechanism.

Further, according to the present invention, there is provided a focusing torque control device for a lens barrel. The device includes an attachment member, a screw shaft and an engaging pin. The attachment member is secured to a circumferential face of a stationary lens barrel of the lens barrel and has a center hole wherein an inner circumferential face thereof is threaded. The screw shaft is screwed into the center hole. The engaging pin is slidably introduced into the screw shaft, pressing against a driven ring arranged in the stationary lens barrel and rotating integrally with the focusing ring. The engaging pin is engageable with the driven ring.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
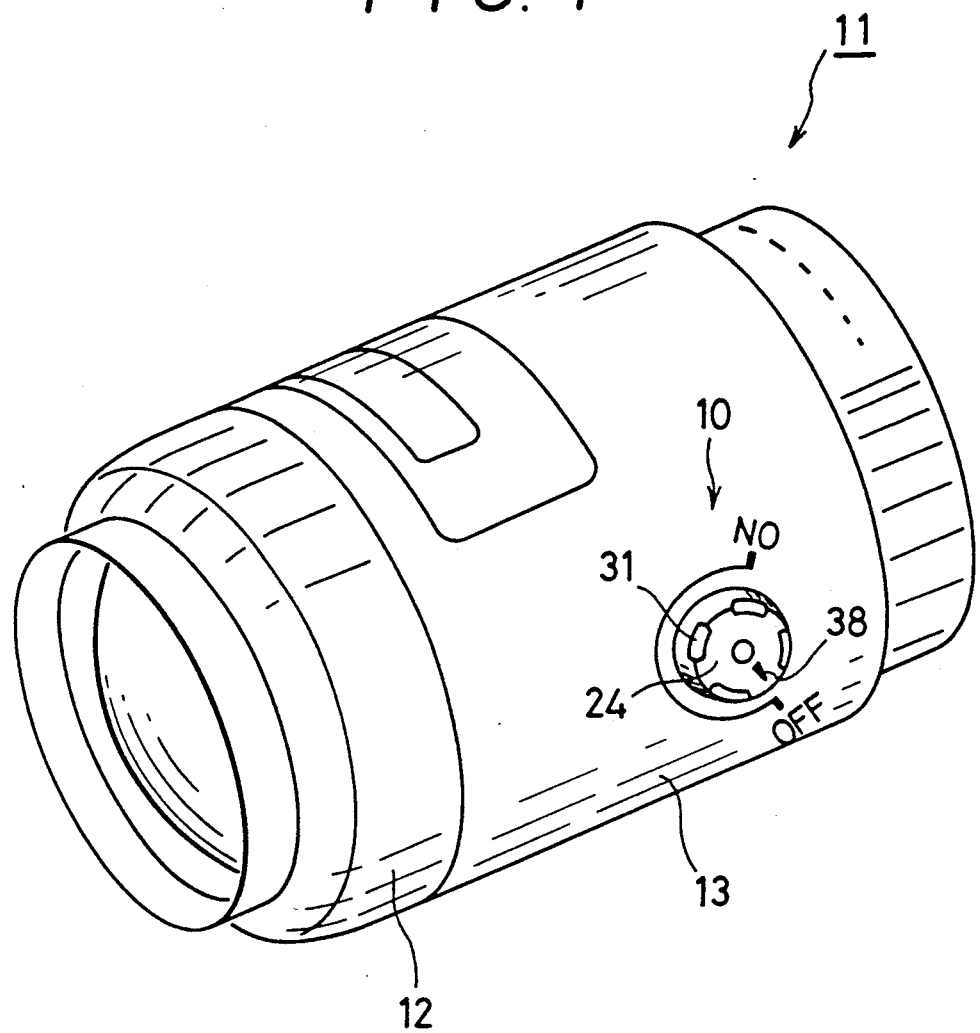
FIG. 1 is a perspective view of a lens barrel equipped with a focusing torque control device according to the present invention.

The present invention will now be described with reference to embodiments shown in the drawings.

FIG. 1 illustrates an AF (automatic focusing) interchangeable lens barrel 11 provided with a focusing torque control device 10 of the embodiment. As shown in the figure, a focusing ring 12 is provided at a front portion of the AF interchangeable lens barrel 11, and is driven by a motor when in the AF mode and manually driven by a photographer when in the MF mode, whereby a group of focusing lens is moved and a focusing operation is carried out. The focusing torque control device 10 is provided at a stationary lens barrel 13 of the AF interchangeable lens barrell 11.

Figure 2:
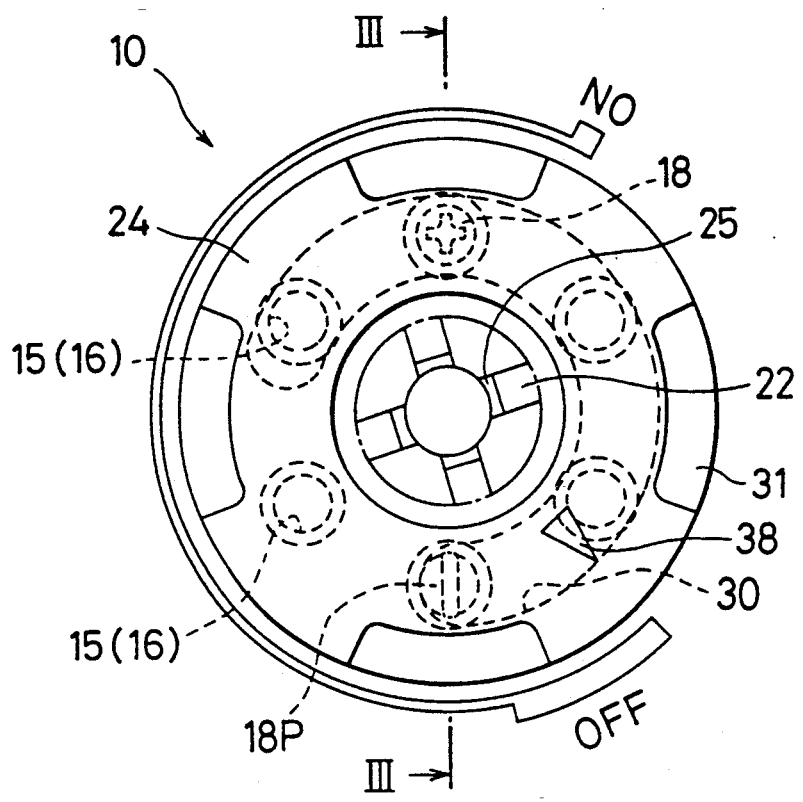
FIG. 2 is a plan view of the focusing torque control device according to the present invention when in the AF mode.
Figure 3:
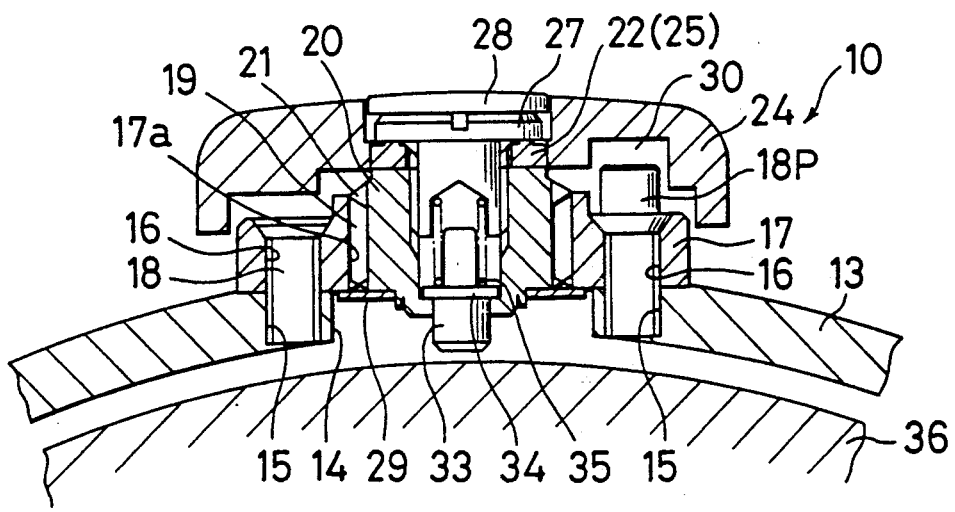
FIG. 3 is a cross-sectional view of the focusing torque control device taken along the line III—III in FIG. 2.

Referring to FIGS. 2 and 3, an attachment hole 14 is formed in the stationary lens barrel 13 and six screw holes 15 are formed in a circle around the attachment hole 14, at intervals of 60 degrees. An annular attachment disk 17 having six fixing holes 16, corresponding to the six screw holes 15, is fixed to the stationary lens barrel 13 by screws 18 in such a manner that a center hole 17a formed in the center of the attachment disc 17, is arranged coaxially with the attachment hole 14. One screw 18P of the six screws 18 is used as a limitation pin.

A female screw 19 is formed on the inner circumferential face of the center hole 17a. A male screw 21, formed on a screw shaft 20, is engaged with the female screw 19. Four recesses 22 are formed at a top face of the screw shaft 20, at intervals of 90 degrees. Four projections 25, engageable with the recesses 22, are formed at intervals of 90 degrees on a dial 24 fixed to the top portion of the screw shaft 20. The dial 24 is fixed to the screw shaft 20 by a fixing screw 27 in such a manner that each projection 25 is engaged with each recess 22. The top face of the fixing screw 27 is covered by a cover 28. After the screw shaft 20 is screwed into the center hole 17a of the attachment disk 17, a spring washer 29 is positioned at the bottom of the screw shaft 20.

A guide recess 30, into which the limitation pin 18P is introduced, is formed on a bottom face of the dial 24; Concave portions 31 are formed at the periphery of the top face of the dial 24.

An engaging pin 33 is slidably introduced into the screw shaft 20, and is projected from the bottom of the screw shaft 20. A compression coil spring 35 is arranged between the fixing screw 27 and a flange 34 of the engaging pin 33. Accordingly, the engaging pin 33 is pressed toward a driven ring 36 that rotates integrally with the focusing ring 12 (see FIG. 1). Therefore, when the focusing ring 12 is rotated, the lens included in the lens barrel 11 is moved along the optical axis thereof.

When the dial 24 is rotated counterclockwise and an index 38 indicates OFF (see FIG. 2), the engaging pin 33 is disengaged from the driven ring 36 (see FIG. 3). Accordingly, when the focusing torque control device 10 is OFF, i.e., when the auto focusing (AF) mode is set, since a frictional force between the engaging pin 33 and the driven ring 36 is equal to 0, the focusing torque is at a minimum. At this time, since the spring washer 29, positioned at the bottom of the screw shaft 20, is engaged with the bottom of the attachment disk 17, a resistance is imposed on the screw shaft 20. Accordingly, the dial 24 is not easily rotated from the OFF position.

Figure 4:
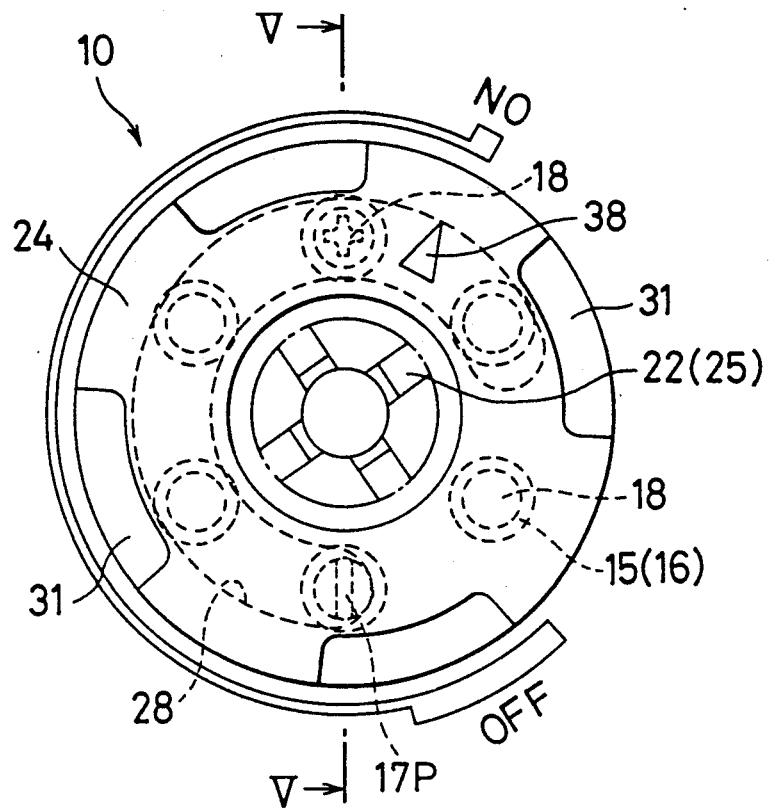
FIG. 4 is a plan view of the focusing torque control device according to the present invention when in the MF mode.
Figure 5:
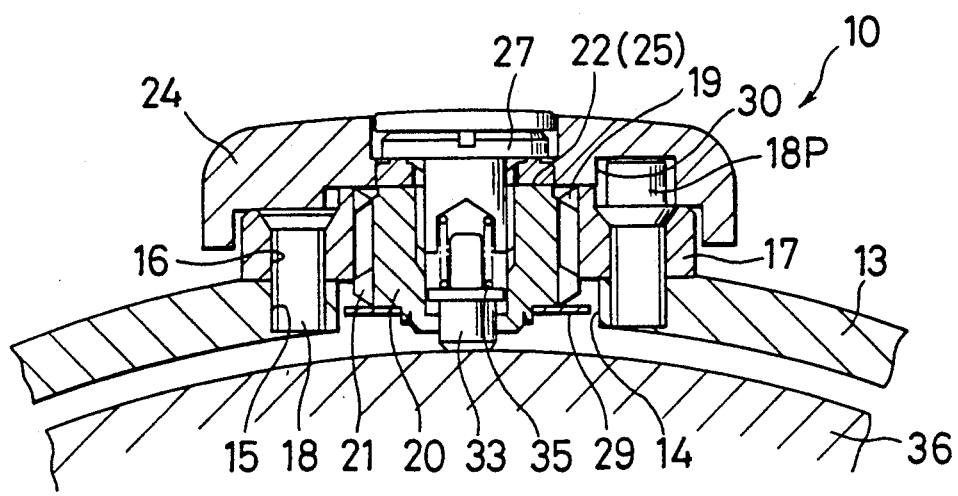
FIG. 5 is a cross-sectional view of the focusing torque control device taken along the line V—V in FIG. 4.

Conversely, when the dial 24 is rotated clockwise and the screw shaft 20 is moved downward in FIG. 5, the engaging pin 33 is engaged with the driven ring 36. When the dial 24 is further rotated clockwise and the index 38 indicates ON (see FIG. 4), the coil spring 35 is compressed and the frictional force between the engaging pin 33 and the driven ring 36 is increased. Accordingly, the focusing torque is controlled to an appropriate amount in the manual focusing mode.

In this state, the frictional force between the engaging pin 33 and the driven ring 36, i.e., the focusing torque, is increased in accordance with an increase in the amount of compression of the coil spring 35. This focusing torque can be easily adjusted by adjusting a stop position, of the dial 24, between the ON and OFF indicators.

The focusing torque, in a state in which the index 38 indicates ON, (see FIG. 4 and FIG. 5), can be adjusted by adjusting a gap between the driven ring 36 and the tip of the engaging pin 33 when the index 38 indicates OFF (see FIG. 2 and FIG. 3). In this connection, however, it is difficult in a manufacturing process to obtain a specific angular relationship between a start point of the male screw 21 and a position of the recesses 22. Therefore, in this embodiment, the focusing torque when the index 38 indicates ON, can be adjusted by rotating the fixed position of the attachment disk 17 to the stationary lens barrel 13 through an angle of 60 degrees. The focusing torque may also be adjusted by rotating the fixed position of the dial 24 to the screw shaft 20 through an angle of 90 degrees, when assembling the same.

Note, although the focusing torque control device for an automatic focusing lens device able to be operated selectively in an automatic focusing mode or a manual focusing mode is described in this embodiment, the present invention can be applied to a focusing torque control device for a manual focusing lens device operated only in the manual focusing mode.

Although the embodiments of the present invention have been described herein with reference to the accompanying drawings, obviously many modifications and changes may be made by those skilled in this art without departing from the scope of the invention.

The present disclosure relates to subject matter contained in Japanese Utility Model Application No. 3-68921 (filed on May 21, 1991) which is expressly incorporated herein by reference in its entirety.

I claim:

1. A focusing torque control device for a lens barrel, said device comprising:
   rotating means rotatably disposed in said lens barrel to move a lens housed in said lens barrel along an optical axis of said lens barrel;
   an engaging member able to be engaged with said rotating means;
   means for mounting said engaging member for movement between positions engaging said rotating means and spaced from said rotating means; and
   frictional force control means for adjustably controlling a frictional force between said rotating means and said engaging member by controlling a pressure by which said engaging member is pressed against said rotating means.

2. A focusing torque control device according to claim 1, wherein said frictional force control means comprises a spring pressing said engaging member against said rotating means.

3. A focusing torque control device according to claim 2, said control means further comprising means for adjusting an amount of compression of said spring.

4. A focusing torque control device according to claim 3, wherein said rotating means is arranged in a stationary lens barrel, said adjusting means having an attachment disk secured to said stationary lens barrel and having a center hole wherein an inner circumferential face thereof is threaded, and a screw shaft screwed into said center hole, said engaging member being slidably introduced into said screw shaft and being projected from the bottom of said screw shaft toward said rotating means.

5. A focusing torque control device according to claim 4, wherein a position at which said attachment disk is to be secured to said stationary lens barrel can be charged to different locations around a center of said attachment disk.

6. A focusing torque control device according to claim 4, wherein said adjusting means having a dial fixed to said screw shaft, and a position at which said dial is to be secured to said screw shaft can be changed to different locations around a center of said screw shaft.

7. A focusing torque control device according to claim 1, wherein said rotating means comprises a focusing ring and a driven ring, said focusing ring being operated by a photographer, and said engaging member being able to be engaged with said driven ring.

8. A focusing torque control device according to claim 1, wherein said lens barrel can be selectively operated in one of an automatic focusing mode and a manual focusing mode, said automatic focusing mode being operated through a drive source and said manual focusing mode being operated without said drive source.

9. A focusing torque control device according to claim 8, wherein said frictional force is equal to 0 in said automatic focusing mode.

10. A focusing torque control device for a lens barrel having a focusing ring, said device comprising:
   an attachment member secured to a circumferential face of a stationary lens barrel of said lens barrel and having a center hole wherein an inner circumferential face thereof is threaded;
   a screw shaft screwed into said center hole; and
   an engaging pin able to be slidably introduced into said screw shaft, pressing against a driven ring arranged in said stationary lens barrel and rotating integrally with said focusing ring, and able to be engaged with said driven ring.

11. The focusing torque control device according to claim 10, said engaging pin mounted for movement between positions engaging with and spaced from said driven ring in association with movement of said screw shaft.

12. The focusing torque control device according to claim 10, said control means comprising means operative during assembly of the lens barrel.

13. The focusing torque control device according to claim 4, said engaging member and said spring being received within said screw shaft.

14. A focusing torque control device for a lens barrel, said device comprising:
- rotating means rotatably disposed in said lens barrel for moving a lens housed in said lens barrel along an optical axis of said lens barrel;
- an engaging member engagable with said rotating means;
- first means, coupled to said engaging member, for moving said engaging member between positions engaged with and disengaged from said rotating means; and
- second means for adjusting a force of frictional engagement between said rotating means and said engaging member, when said engaging member is engaged with said rotating means.

15. The focusing torque control device according to claim 14, said second means comprising a spring pressing said engaging member against said rotating means and means for adjusting an amount of compression of said spring.

16. The focusing torque control device according to claim 14, further comprising an annular disk secured to said stationary lens barrel and having a threaded central aperture, a threaded member threadable engaging said central aperture, and a dial fixed to said threaded member.

17. The focusing torque control device according to claim 16, said second means comprising means for adjusting a position of said annular member with respect to said lens barrel.

18. The focusing torque control device according to claim 16, said second means comprising means for adjusting a position of said dial with respect to said threaded member.

19. The focusing torque control device according to claim 16, said annular disk, said threaded member, and said dial member being concentrically rotatable about an axis extending transverse to the optical axis of said lens barrel.

20. The focusing torque control device according to claim 14, said rotating means comprising a focusing ring and a driven ring, said focusing ring being operated by a photographer, and said engaging member being engagable with said driven ring.

21. The focusing torque control device according to claim 14, said lens barrel being selectively operable in an automatic focusing mode and in a manual focusing mode, wherein, in said automatic focusing mode, said lens barrel is operated by a drive source and in said manual focusing mode, said lens barrel is operated without said drive source.

* * * * *

UNITED STATES PATENT AND TRADEMARK OFFICE
CERTIFICATE OF CORRECTION

PATENT NO. : 5,305,036
DATED : April 19, 1994
INVENTOR(S) : Hitoshi TANAKA

It is certified that error appears in the above-indentified patent and that said Letters Patent is hereby corrected as shown below:

At column 4, line 32 (claim 5, line 4), change "charged" to ---changed---.

Signed and Sealed this

Fourteenth Day of February, 1995

*Attest:*

BRUCE LEHMAN

*Attesting Officer*      *Commissioner of Patents and Trademarks*